United States Patent [19]

Hubbard

[11] Patent Number: 4,842,470
[45] Date of Patent: Jun. 27, 1989

[54] LOW ANGLE APPROACH TILT BED

[76] Inventor: John S. Hubbard, R.R. 1, Box 36, Parker City, Ind. 47368

[21] Appl. No.: 20,896

[22] Filed: Mar. 2, 1987

[51] Int. Cl.$^4$ .............................................. B60P 3/12
[52] U.S. Cl. .................... 414/478; 296/182; 298/14; 410/30
[58] Field of Search ................ 414/477–480, 414/491, 494, 469; 298/12, 14; 296/182–184; 410/3, 4, 7, 19, 30, 49

[56] References Cited

U.S. PATENT DOCUMENTS

| | | | |
|---|---|---|---|
| 1,266,500 | 5/1918 | Lee | 298/17.5 X |
| 1,460,810 | 7/1923 | Cadman | 298/17.8 |
| 2,468,502 | 4/1949 | Lisota | 414/478 X |
| 2,588,001 | 3/1952 | Holland | 414/478 X |
| 2,761,730 | 9/1956 | Black, Jr. | 298/17.5 |
| 2,898,148 | 8/1959 | Fewster | 298/17.5 |
| 3,032,217 | 5/1962 | Musson et al. | 414/477 X |
| 3,074,574 | 1/1963 | Prince | 414/477 |
| 3,198,363 | 8/1965 | Snead | 298/17.5 X |
| 3,450,282 | 6/1969 | Ezolt | 414/477 |
| 4,261,676 | 4/1981 | Balling, Sr. | 298/18 X |
| 4,456,420 | 6/1984 | Newhard | 414/477 X |
| 4,619,484 | 10/1986 | Maxey | 298/18 |

FOREIGN PATENT DOCUMENTS 9783 of 1927 Australia ............................. 298/12

OTHER PUBLICATIONS

American Towman, vol. 9, No. 7, Dec. 1986, article entitled "Distributing the Load", and selected advertisements cited by applicant.
Tow Times, vol. 4, No. 6, Jan. 1987, p. 37 and selected advertisements cited by applicant.

Primary Examiner—David A. Bucci

[57] ABSTRACT

In an automobile tow truck, the towing bed of the present invention includes a concave floor having a radius of curvature of 50 feet. Channel beam segments are welded to the lateral edges of the concave floor. The lower flange of the beam segments terminates slightly beyond the mid-line of the concave floor. The central web of the beam segments spans between the beam flanges, but is trimmed to match the curvature of the curved floor beyond the point of termination of the lower flange. A vertical plate is welded at the front edges of the concave floor and the channel beam segments. A triangular plate is welded at each side of the towing bed to the upper flange of the channel beam segments, the vertical plate and the concave floor. An additional section of metal plate is welded to the underside of the concave floor at the rear approach edge of the towing bed to add strength and durability. Rails coextensive with the towing bed are affixed to the surface of the bed in spaced relation to opposite ones of the channel beam segments.

17 Claims, 11 Drawing Sheets

LOW ANGLE APPROACH TILT BED

BACKGROUND OF THE INVENTION

1. Field of the Invention:

This invention pertains to the field of automobile tow trucks. In particular, this invention concerns towing bed, tilt bed, and slide-back carriers adapted for use on one- or two-ton trucks.

2. Description of the Prior Art:

Tow trucks comprised of flat bed trailers or flat bed one-ton type trucks are common in the prior art. In tow trucks of this type, the flat bed is movably mounted to the truck frame to allow the bed to be moved from a carrying position to a loading position. In the former configuration, the bed and its payload, an automobile, are situated substantially on the vehicle frame so that the center of gravity of the bed and automobile fall between the vehicle axles. In the loading position, the bed is typically projected rearward from the back of the vehicle frame and tilted downward into contact with the ground to form a ramp. The vehicle is then pulled onto the bed by a winch. Once the automobile is tied down, the bed is returned to the carrying position.

The slide-back flat bed carriers are designed to perform this function by, first, elevating the front of the bed and then, second, sliding the bed back until the rear edge of the bed contacts the ground. The 17 foot Aluminum Weight Watcher sold by Fazekas Industries is typical of the slide-back carriers employing slide beams that are tilted into position and upon which the flat bed slides. Tow trucks manufactured by Landoll Corporation ("Loadoll I"), Brimec, Century Wrecker Corporation, Jerr-Dan Corporation ("Wrangler"), and Aatac, Inc., advertised and described in the trade magazines American Towman, Vol. 9, No. 7, 1986, Dec., 1986, and TowTimes, Vol. 4, No. 6, Jan., 1987, for example, are of similar design.

In one or two-ton slide-back carriers the angle at which the bed contacts the ground —i.e. the loading or approach angle - is typically 10–15 degrees. For lower loading angles, a semi or tractor-trailer rig is required since a lower anqle requires in the prior art. a longer bed. The length of bed necessary to qenerate a sub 10 degree loading angle is too long for even the largest 1 or 2 ton truck. Flat bed trailers such as the "Model TK705A" by Trail King Industries, Inc., can achieve a loading angle approaching 7 degrees. Use of optional ramps can produce a 5 degree angle, such as the "Hydra-Trail" of Ledwell and Sons.

Shallow loading angles are required to achieve front and rear end clearance as the automobile is hoisted onto the flat-bed. In late model year cars, these clearances are smaller, thus shallower loading angels are required. These shallower angles are well below the capability of the one-ton or two-ton slideback carrier trucks of the prior art. Resort to a trailer to serve as a tow truck is both cumbersome and expenslve. The use of additional ramps is equally cumbersome.

SUMMARY OF THE INVENTION

In a tow truck having a vehicle frame with a longitudinal axis, and a pair of wheel axles at longitudinally opposite ends of the frame, a towing bed comprising a concave floor of generally rectangular shape having a pair of lateral edges, a forward edge and a rear approach edge and means for moving the towing bed from a horizontal carrying position generally parallel to the vehicle frame, to a loading position in which the towing bed is tilted relative to the end of the vehicle frame.

It is an object of this invention to provide a tilt bed capable of reaching a shallow loading angle of five degrees without the necessity of additional ramps or lengthened towing beds. An additional object is to reduce the weight of the towing bed to allow for an increase in towing capacity or a decrease in the load on the tow truck engine and hydraulics. Still a further object is to provide for a mechanism for moving the towing bed that is smaller, lighter and less expensive than the large bore hydraulic cylinders of the prior art. Related objects and advantages of the present invention will be made obvious from the disclosure of the preferred embodiments.

DESCRIPTION OF THE PREFERRED EMBODIMENTS

Figure 1:
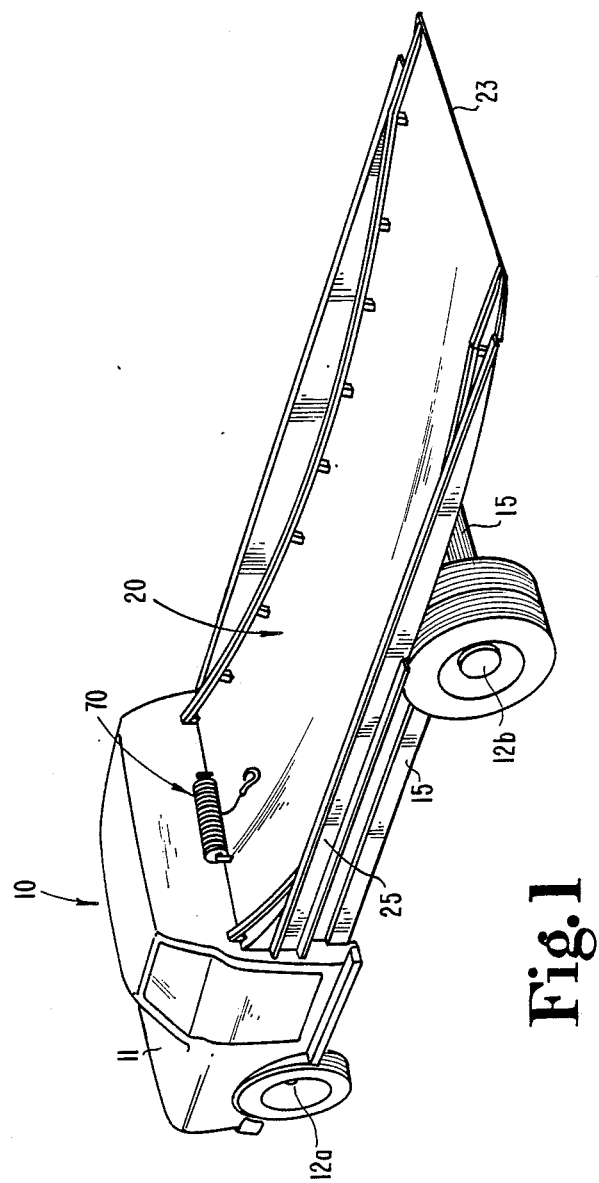
FIG. 1 is a perspective view of a tow truck including the towing bed of the present invention.

For the Purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

A tow truck 10 comprises a cab 11, front and rear wheel assemblies 12a and 12b, respectively, and a frame 15. A towing bed 20 of applicant's preferred embodiment is mounted on frame 15, resting in a retracted or carrying position as shown in FIG. 1. Bed 20 is shown with a hoisting winch 70 mounted at the front end of the bed.

Figure 2:
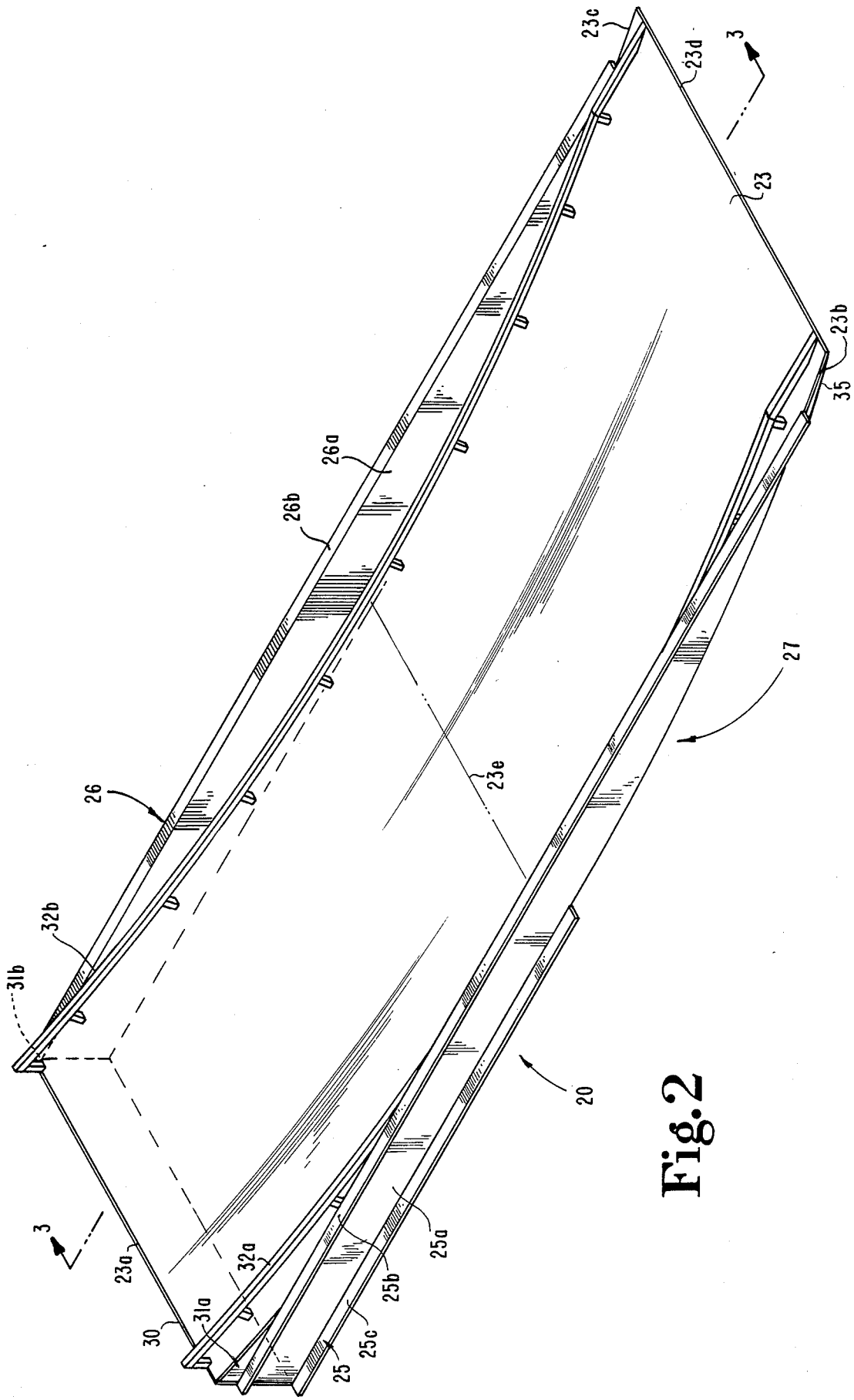
FIG. 2 is a perspective view of the towing bed of the preferred embodiment of the present invention.

Towing bed 20 is illustrated separately in FIG. 2. Towing bed 20 comprises a concave floor 23 opening vertically upward. Concave floor 23 is rectangular in shape and has a front edge 23a, left and right side edges 23a and 23c, and a rear approach edge 23d. Channel beam segments 25 and 26 are welded to left and right side edges 23b and 23c, respectively. Beam segment 25 comprises a central web 25a, and upper and lower flanges 25b and 25c, each perpendicular to the central web 25a. Beam 26 is similarly constructed. Concave floor 23 is affixed perpendicularly to the inner surface of central webs 25a and 26a. The floor extends above upper flanges 25b and 26b at front edge 23a and rear edge 23d, as shown in FIG. 2.

Upper flanges 25a and 26b are generally longitudinally coextensive with concave floor 23. Lower flanges 25c and 26c, however, terminate slightly aft of a mid-line 23e of floor 23. Central webs 25a and 26a are trimmed to match the curvature of the concave bed in a region 27 aft of mid-line 23e.

A plate 30 is welded to the front edges of the left and right channel beam segments, as well as to front edge 23a of concave floor 23. Side rails 32a and 32b are affixed to bed 20 and run parallel to channel beam segments 25 and 26 along the entire length of concave floor 23. Rails 32a and 32b are located about two inches inboard of edges 23b and 23c, respectively, to provide space to pass tie-down chains around the rails.

Triangular plates 31a and 31b are welded into place against front plate 30, concave floor 23 and upper flange 25b and 26b. An additional plate can be welded at rear approach edge 23d, such as wear plate 35. Plate 35 provides an additional wear surface to improve the life and durability of rear edge 23d of the concave bed 23. A wedge-shaped plate 35, tapering toward rear approach edge 23d as shown in the cross-sectional view of FIG. 3, also adds a stable resting surface when the bed is fully tilted.

Towing bed 20 previously described is strong, yet of lighter weight than the prior art slide-back flat bed devices. Concave bed 23 is composed, in applicant's preferred embodiment, of standard steel floor plate, preferably 16 gauge, although the floor can be constructed of aluminum plate having a thickness of ⅛-3/16 inches.

Channel beam segments 25 and 26 are fabricated from MC12×10.6 channels with a 0.190 inch stock thickness and 1.5 wide flanges. Front plate 30 and triangular plates 31a and 31b are also 0.190 inches thick.

Figure 3:
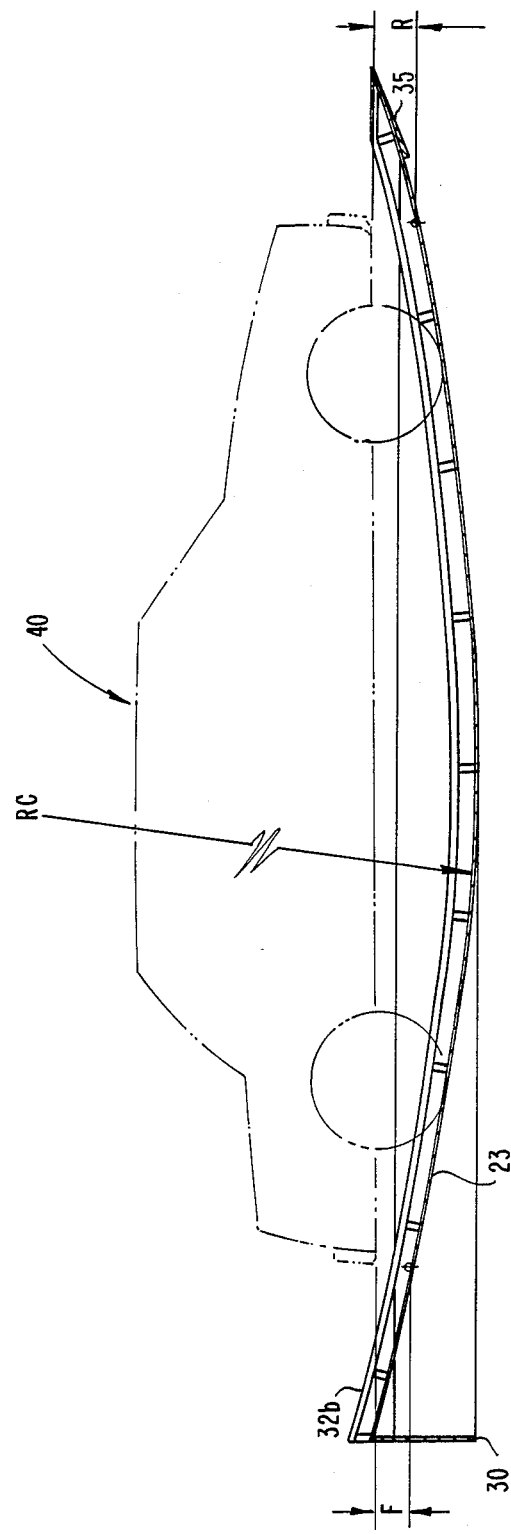
FIG. 3 is a side cross-sectional view of the towing bed of FIG. 2 taken along the line 3—3 and viewed in the direction of the arrows.

No lateral support struts are required with this structure. The curvature of the concave bed provides geometric stiffness to the towing bed 20 allowing the use of thin gauge steel sections. The radius of curvature, designated by RC in the cross-sectional view of FIG. 3, is nominally 50 feet. Radius of curvature RC is calibrated to allow front end and rear end clearance F and R, respectively, for an automobile 40, shown in phantom in FIG. 3, being carried on the tow truck. For a truck having a 120 inch frame behind the cab, the length of the towing bed is 229 inches, thereby allowing the center of gravity CG of bed 20 to lie forward of rear wheel assembly 12b in the retracted or carrying configuration.

Figure 4:
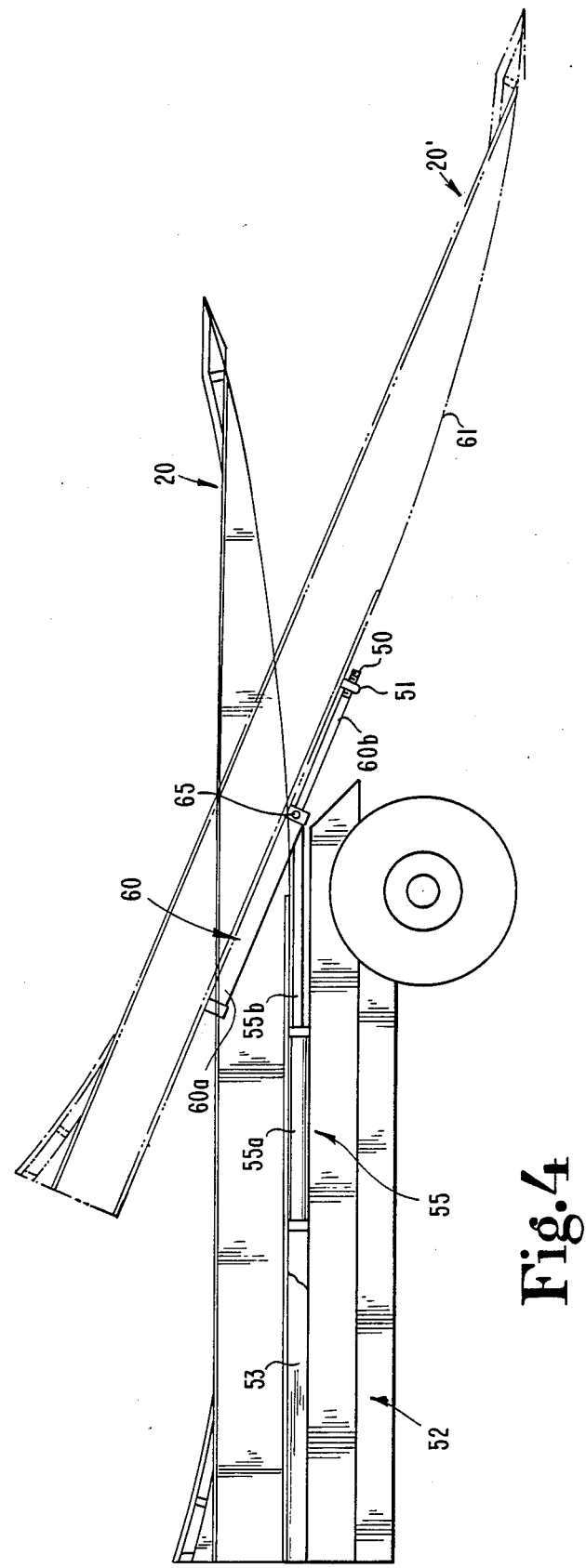
FIG. 4 is a side view of the towing bed showing the first and second hydraulic actuators and the towing bed in the retracted and extended positions.

FIG. 4 shows the mechanism for moving towing bed 20 from a retracted position to an extended, or loading, position 20', shown in phantom. The part of the mechanism situated on the left side of the tow truck will be described, it being understood that a similar mechanism is employed on the right side of the vehicle. The mechanism of the preferred embodiment comprises two hydraulic actuators 55 and 60. Actuator 55 has a cylinder body 55a and a piston rod 55b. Cylinder body 55a is fixedly mounted to beam 53 of the truck frame 52. As shown in FIG. 4, piston rod 55b strokes in a horizontal plane parallel to truck frame 52. The extended position of rod 55b is shown in phantom in FIG. 5.

Second hydraulic actuator 60, shown with towing bed 20' in the loading position for clarity, includes a cylinder body 60a and a piston rod 60b. Piston rod 60b is mounted to underside of towing bed 20', preferably by a threaded piston rod end 50 which is threadedly received into a rod eye of a flange 51 mounted to the bed. A clevis and pin arrangement can also be employed in lieu of threaded rod end 50 and flange 51. It can be seen from FIG. 4 that the piston rod 60b strokes in a plane tangent to the concave floor 61, regardless of the angular orientation of the floor relative to the truck frame 52. Bed 20' slides over actuator body 60a as the piston 60b is stroked. The extended position of second actuator 60 is shown in phantom in FIG. 5.

Body 60a of second actuator 60 is pivotably connected to the end of piston rod 55b of first horizontal actuator 55. In this preferred embodiment, a clevis or yoke coupling 67 is fixed to cylinder body 60a. Piston rod 55b has in its distal end an eye 68 that receives a coupling rod 69, which also extends through the eyes of yoke coupling 67. Thus, body 60a,and, consequently, second actuator 60 and towing bed 20, are free to rotate on a lateral pivot axis 65, which extends longitudinally through coupling rod 69, to rotate relative to piston rod 55b and truck frame 52. The purpose behind this pivotable link between the two hydraulic actuators is made clear in an explanation of the function of the mechanism, with reference to FIGS. 6-10.

Figure 6:
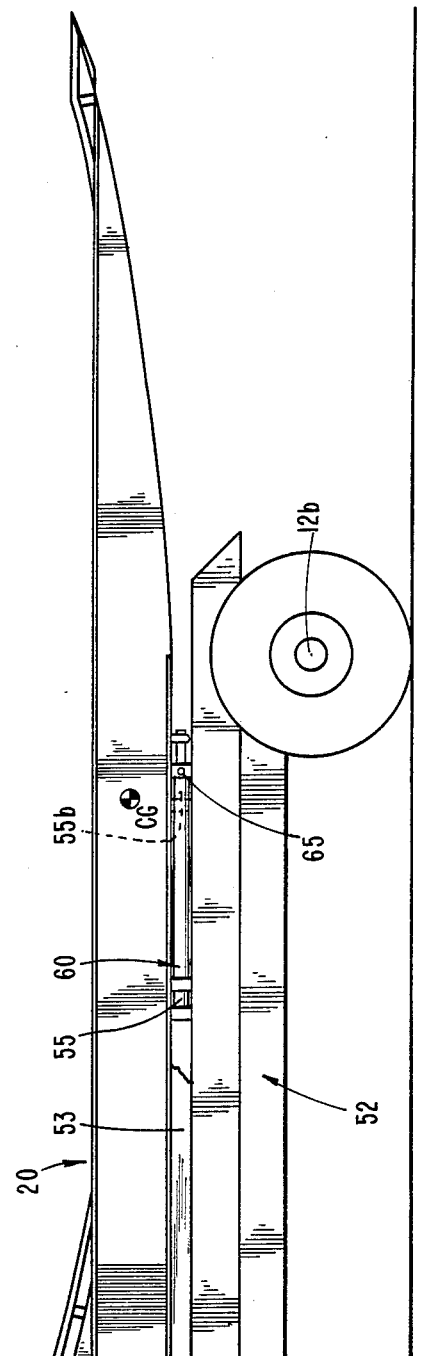
FIG. 6 is a side view of the towing bed and actuators, shown with the towing bed in the retracted position.

In FIG. 6, towing bed 20 is shown in the retracted or carrying position. The piston rods in both hydraulic actuators 55 and 60 are fully retracted within the respective cylinder bodies. It should be noted that center of gravity CG of towing bed 20 is forward of rear wheel assembly 12b and pivot axis 65 so that the towing bed is in a stable orientation on the truck.

Figure 7:
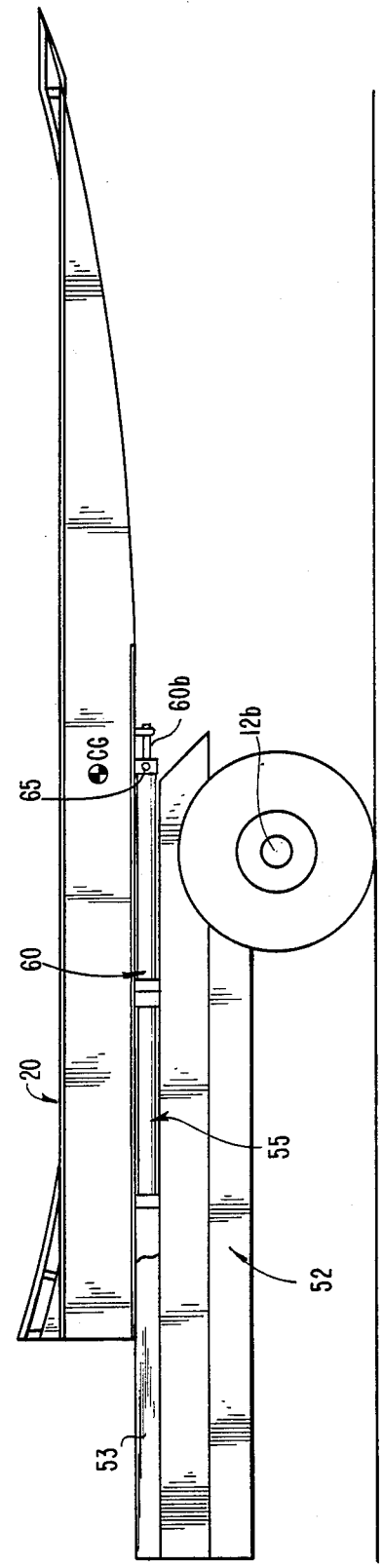
FIG. 7 is the side view of FIG. 6, shown with the towing bed longitudinally translated along the vehicle frame.

As piston rod 55b of first horizontal actuator 55 is extended, the rod and towing bed 20 move horizontally to the position illustrated in FIG. 7. In this position, center of gravity CG of towing bed 20 is at or beyond rear wheel assembly 12b and the end of the truck frame. However, center of gravity CG remains forward of pivot axis 65 so that towing bed 20 stays in a horizontal orientation.

Figure 8:
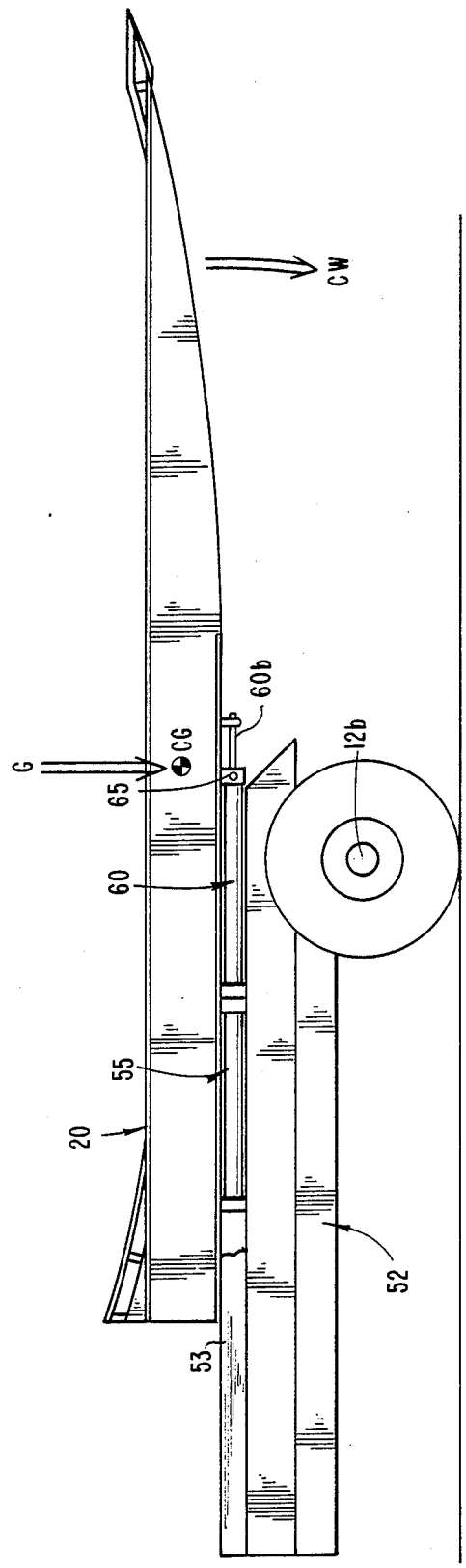
FIG. 8 is the side view of FIG. 7, shown with the towing bed further translated along the vehicle frame so that the towing bed center of gravity extends beyond the end of the vehicle frame.
Figure 9:
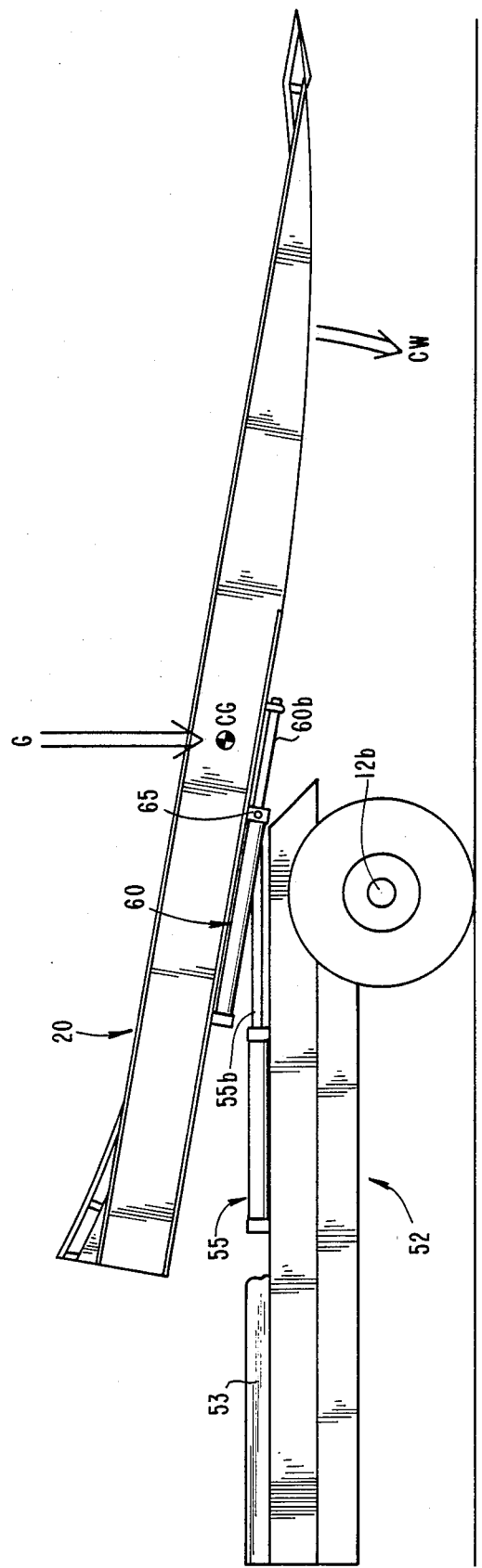
FIG. 9 is the side view of FIG. 8, shown with the towing bed rotated relative to the vehicle frame.

As piston rod 60b of second actuator 60 is extended, the towing bed slides along cylinder body 60a until center of gravity CG is beyond or aft of pivot axis 65, as demonstrated in FIG. 8. At this point, the downward force of gravity G, indicated by the heavy arrow in FIG. 8. acting on the center of gravity, causes towing bed 20 to pivot about pivot axis 65, as indicated by the clockwise arrow CW. As piston rod 60b extends further, center of gravity CG moves farther aft of pivot axis 65 and the towing bed pivots further about the pivot axis, as shown in FIG. 9.

Figure 10:
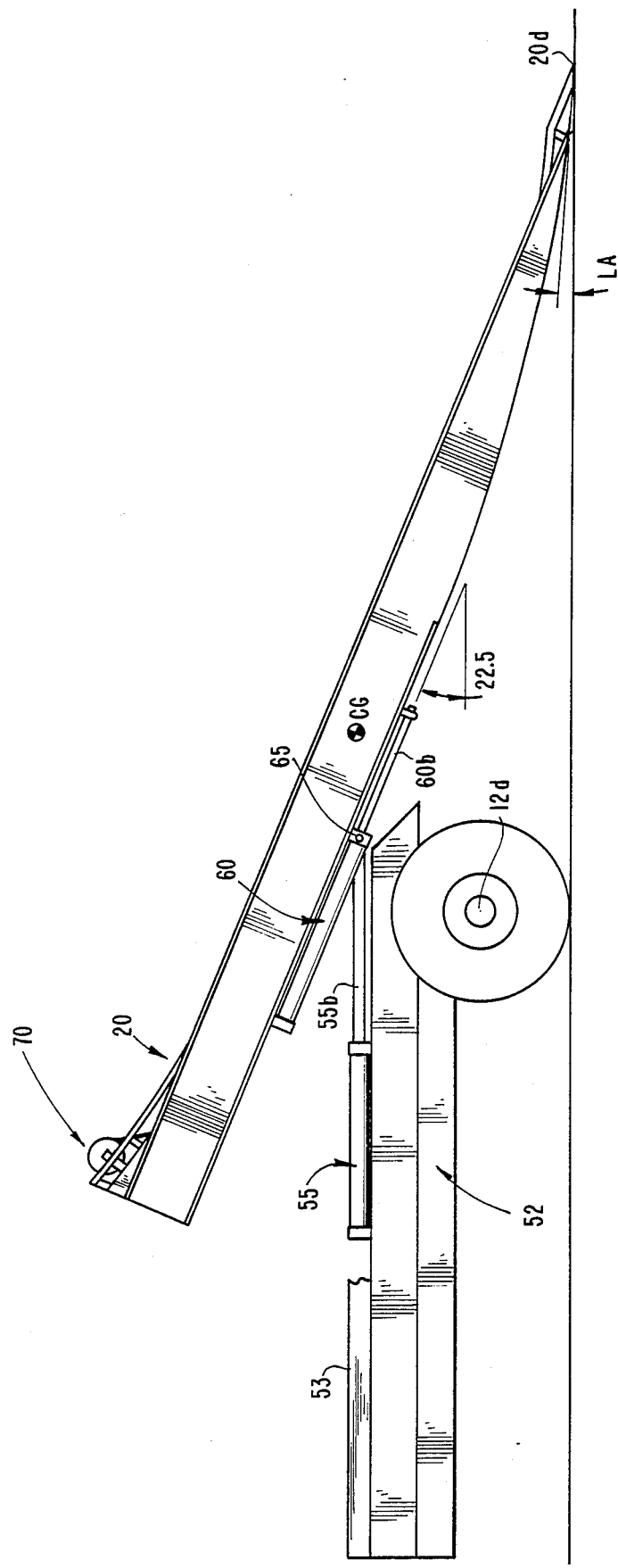
FIG. 10 is the side view of FIG. 9, shown with the vehicle fully extended and rotated to the loading position.

When piston rod 60b is at or near full stroke, rear approach edge 20d of towing bed 20 is in contact with the ground, and the towing bed is in the loading position shown in FIG. 10. In this position, the towing bed center of gravity CG is extended beyond the end of the truck frame and as towing bed 20 is tilted at approximately a 22.5 degree angle relative to the horizontal truck frame. Although the 22.5 degree tilt angle of the towing bed is too severe for loading an automobile onto the towing bed, the curvature of concave floor allows for a much lower loading angle LA at the rear approach edge 20d. The loading angle LA is measured between the horizontal ground and a plane tangent to the concave floor passing through the rear approach edge 20d.

From the view of FIG. 10, it is seen that a flat bed oriented in this manner would have a loading angle of 22.5 degrees. A lower angle could be achieved by providing a longer bed or by increasing the hydraulic actuator stroke length. In such a case, however, additional structure is necessary at a cost and weight penalty. Furthermore, a flat bed would necessarily extend farther to the rear of the tow truck making use of the flat bed more cumbersome or impossible in tight spaces. The use of the concave bed of applicant's invention alleviates these problems.

Once an automobile is winched onto the towing bed, using winch 70, and tied down, the towing bed is restored to the carrying position by, first, retracting piston rod 60b of the second hydraulic actuator. As the rod is retracted, the center of gravity of the loaded towing bed shifts forward toward pivot axis 65, and the towing bed rotates counter-clockwise about the pivot axis. Once the center of gravity of the loaded bed reaches the pivot axis, the towing bed assumes a horizontal orientation and is clear of the end of the truck frame. Piston rod 55b of first actuator 55 is then retracted, pulling the loaded towing bed horizontally forward onto the truck frame into the carrying position.

The hydraulic actuators of this preferred embodiment are double acting for powered extension and retraction. The actuators have a bore diameter of 2 inches. Since the towing bed pivots from the horizontal to the tilted orientation by gravity alone, a smaller actuator can be used. The actuators used in the prior art typically have bore diameters of 4–6 inches, since these actuators raise and translate the slide-back or tilt bed. Larger actuators mean a larger hydraulic system which adds weight and cost to the tow truck.

The hydraulic actuators just described are mirrored on the right side of the tow truck. The set of horizontal first actuators operate in parallel off the same hydraulic lines, and the set of second actuators are, likewise, connected in parallel. The hydraulics for the set of second actuators can incorporate a variable valve to change the rate of extension or retraction. Since the towing bed pivots freely, controlled only by the distance of the center of gravity from the pivot axis, additional control of the rate of pivoting can be garnered by monitoring the stroke rate. It is also possible to affix snubbers or flexible biscuits at the forward and rear edges of the towing bed to absorb the impact of the freely rotating bed against the truck frame or the ground.

Figure 5:
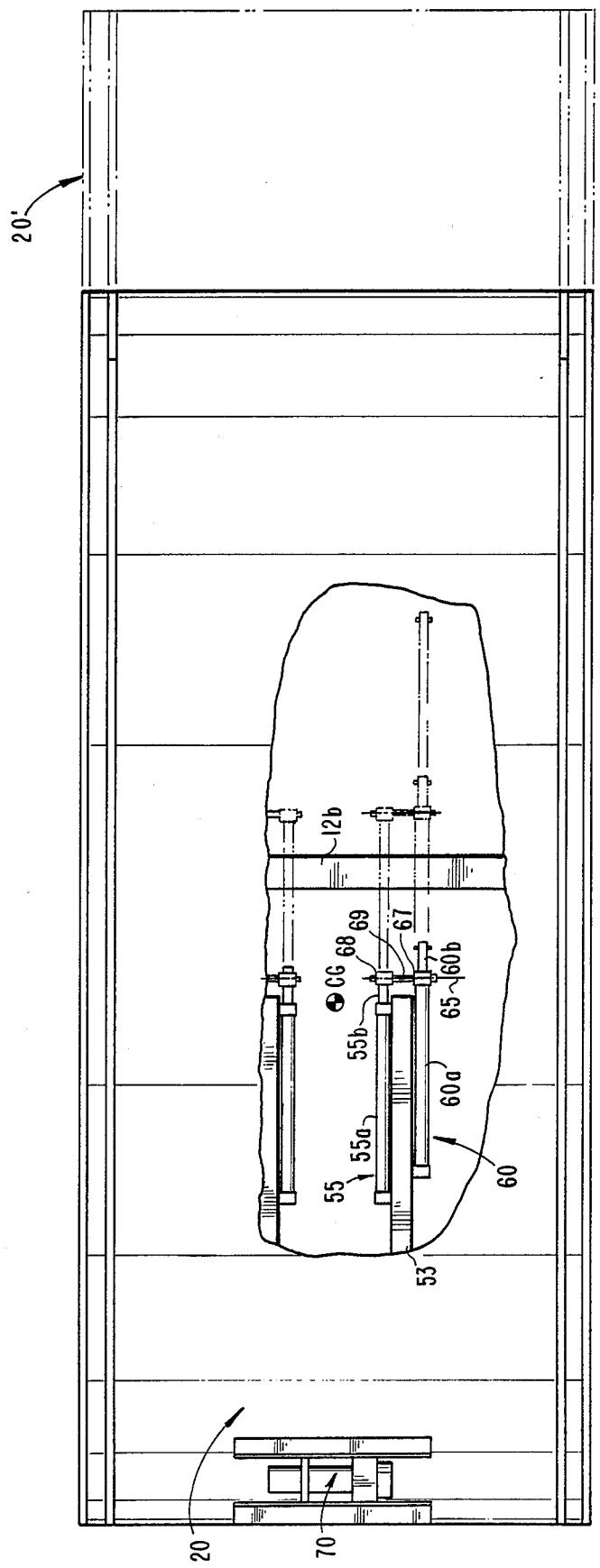
FIG. 5 is a top view of the towing bed with a cutaway to show the orientation of the first and second hydraulic actuators in the retracted position with the extended positions of !he actuators and towing bed shown in phantom.

Winch 70 can be mounted on the concave floor adjacent the forward edge of the floor, as shown in FIGS. 1, 5 and 10. The winch can be used to pull the automobile onto the towing bed when the towing bed is in the loading position, or to restrain the automobile when the towing bed is in the carrying position. In applicant's preferred embodiment, a variable speed planetary winch is used to provide a variable pull-up speed to accommodate a variety of vehicle towing scenarios.

Figure 11:
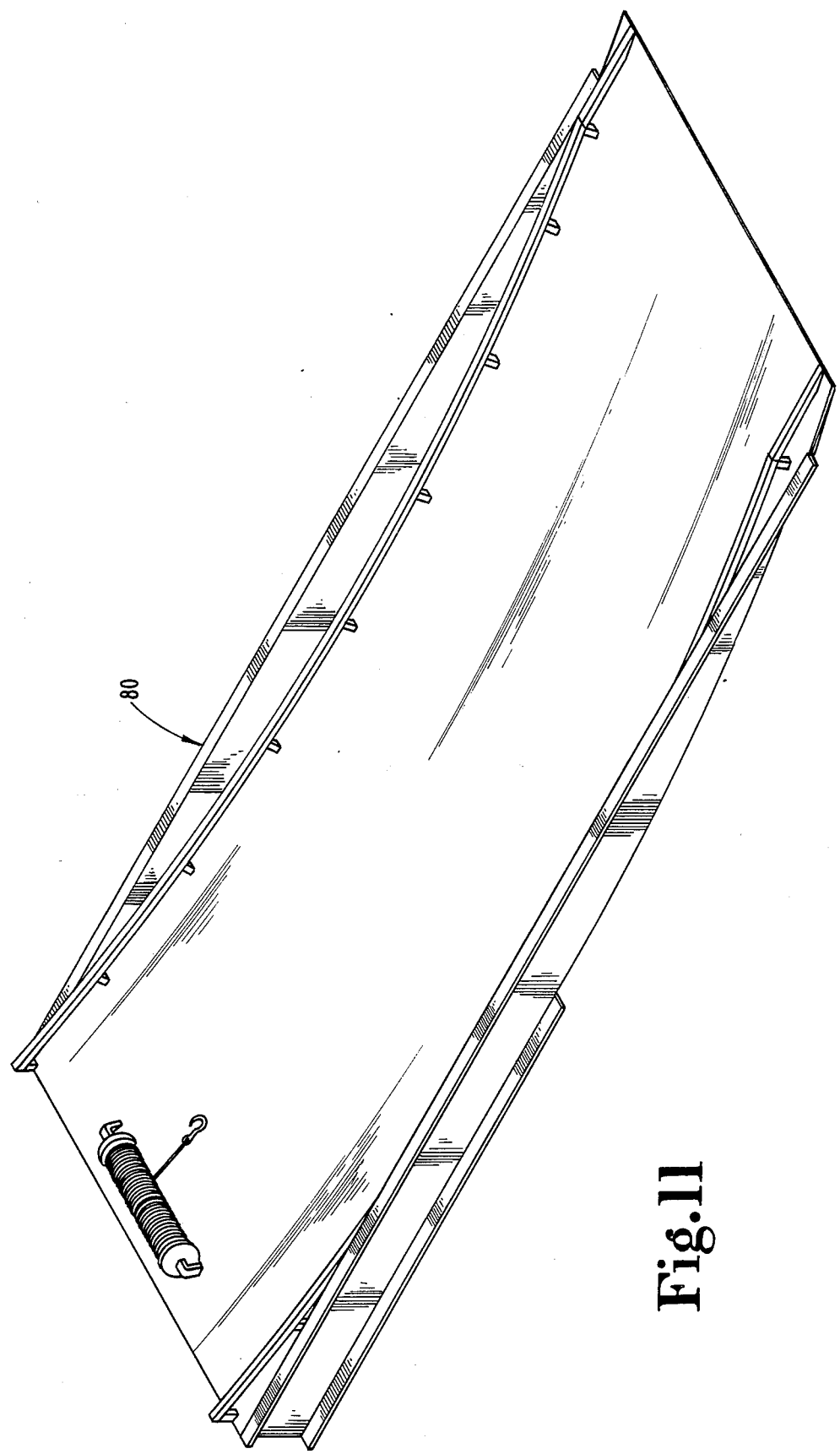
FIG. 11 is a perspective view of the towing bed of a second embodiment in which the concave floor is shortened.

Applicant's invention is designed for a standard 120 inch one-ton truck bed. However, the principle of this invention is applicable to a wide variety of truck beds. For instance, the concave floor towing bed of the present invention can be adapted for use on an 84 inch truck bed by removing about 24 inches of the concave floor at the front edge, such as a towing bed 80 illustrated in FIG. 11. Otherwise, towing bed 80 and the translation mechanism associated with the towing bed are identical to the towing bed 20, previously described, which was designed for use on a 120 inch truck bed.

It is apparent from this disclosure that this invention represents an improvement over the prior art lat bed slide-back or tilt bed tow trucks. Applicant's invention is capable of achieving a five degree loading or approach angle while reducing overall towing bed weight and complexity. The concave floor of this invention produces this low loading angle, maintains front and rear end clearance for an automobile loaded on the towing bed, and adds geometric stiffness to the towing bed design. Furthermore. the free pivoting second hydraulic actuator allows the force of gravity to assist in extending and retracting the towing bed, thereby reducing the cylinder bore and hydraulic capacity requirements for the tow truck.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. In a tow truck having a vehicle frame with a longitudinal axis, and a pair of wheel axles at longitudinally opposite ends of said frame, a towing bed comprising:
   a substantially continuously arcuate floor having a constant radius of curvature and a generally rectangular shape having a pair of lateral edges, a forward edge and a rear approach edge and being substantially concave between said forward and said rear edges; and
   means connected to said towing bed and said vehicle frame and operable for moving said towing bed from a horizontal carrying position generally parallel to said vehicle frame, to a loading position in which the towing bed is tilted about the end of the vehicle frame.

2. The towing bed of claim 1, wherein:
   said bed includes a longitudinal center of gravity;
   said means for moving includes means for tilting said towing bed relative to said vehicle frame such that said bed is progressively pivoted due to the action of gravity on said center of gravity as said towing bed is moved between said carrying position and said loading position; and
   said means for tilting includes a pivot axis, said pivot axis being perpendicular to and in the horizontal plane of said longitudinal axis.

3. The towing bed of claim 1, wherein:
   said arcuate floor has a radius of curvature such that, when said towing bed is in said loading position, a plane tangent to the arcuate floor passing through the rear approach edge forms an angle of five degrees relative to a horizontal plane passing through the rear approach edge.

4. The towing bed according to claim 3, wherein said radius of curvature is fifty feet.

5. In a tow truck having a vehicle frame with a longitudinal axis, and a pair of wheel axles at longitudinally opposite ends of said frame, a towing bed comprising:
   a concave floor of generally rectangular shape having a pair of lateral edges, a forward edge and a rear approach edge;
   means connected to said towing bed and said vehicle frame and operable for movig said towing bed from a horizontal carrying position generally parallel to said vehicle frame, to a loading position in which the towing bed is tilted relative to the end of the vehicle frame;
   said bed further includes a longitudinal center of gravity;
   said means for moving including means for tilting said towing bed relative to said vehicle frame such that said bed is progressively tilted due to the action of gravity on said center of gravity;
   said means for tilting including a pivot axis, said pivot axis being perpendicular to and in the horizontal plane of said longitudinal axis; and
   wherein said means for moving further comprises:
      first translation means, mounted between said vehicle frame and said means for tilting, for moving said means for tilting longitudinally relative to said vehicle frame; and
      second translation means, mounted between said means for tilting and said towing bed, for moving said towing bed linearly relative to said means for tilting.

6. The towing bed according to claim 5, wherein:
   said first translation means includes a first hydraulic cylinder with a first cylinder body, mounted to said vehicle frame, and a first piston rod, engaged to said means for tilting.

7. The towing bed according to claim 5, wherein:
   said second translation means includes a second hydraulic cylinder with a second cylinder body, engaged to said means for tilting so that said second cylinder rotates freely about said pivot axis, and a second piston rod, mounted to said towing bed.

8. The towing bed according to claim 6, wherein:
   said second translation means includes a second hydraulic cylinder with a second cylinder body, engaged to said means for tilting so that said second cylinder rotates freely about said pivot axis, and a second piston rod, mounted to said towing bed.

9. The towing bed according to claim 8, wherein:
   said second translation means is arranged so that as the second piston rod is extended, said second cylinder and said bed progressively rotate about said pivot axis due to the action of gravity on said center of gravity of said bed, the amount of rotation being related to the distance said second piston rod is extended; and
   said second hydraulic cylinder has a stroke length calibrated such that when said tow truck is standing on the ground and said second piston rod is extended to said stroke length, the amount of rotation of said bed allows said rear approach edge to contact the ground without sliding along the ground.

10. In a tow truck having a vehicle frame with a longitudinal axis, and a pair of wheel axles at longitudinally opposite ends of said frame, a towing bed comprising:
   an arcuate floor of generally rectangular shape having a pair of lateral edges, a forward edge and a rear approach edge and being substantially concave between said forward and said rear edges; and
   means connected to said towing bed and said vehicle frame and operable for moving said towing bed from a horizontal carrying position generally parallel to said vehicle frame, to a loading position in which the towing bed is tilted relative to the end of the vehicle frame; and
   a pair of beam members, each of said pair having a central web, and each of said pair affixed at said web to opposite ones of said lateral edges, wherein said beam members include;
   an upper flange perpendicular to said central web at an upper portion of said web and generally coextensive with said concave floor;
   a lower flange perpendicular to said central web at a lower portion of said web and terminating at midlength of the concave floor; and
   wherein said central web spans between said upper and lower flanges until the lower flange terminates, thereafter said lower portion of said web following the curvature of the concave floor.

11. The combination of:
   a truck having a vehicle frame, a longitudinal axis, and a pair of wheel axles at longitudinally opposite ends of said frame;
   a towing bed mounted on said truck, said towing bed including a substantially continuously arcutate floor having a constant radius of curvature and a generally rectangular shape, substantially concave between its front and its rear edges; and
   means connected to said towing bed and said truck for moving said towing bed from a horizontal position generally parallel to said frame, to a loading position in which the towing bed is tilted about the end of the frame.

12. The combination of claim 11 further comprising a hoisting winch mounted adjacent the forward edge of said bed.

13. The combination of:
   a truck having a vehicle frame, a longitudinal axis, and a pair of wheel axles at longitudinally opposite ends of said frame;
   a towing bed mounted on said truck, said towing bed including a concave floor of generally rectangular shape;
   means connected to said towing bed and said truck for moving said towing bed from a horizontal position generally parallel to said frame, to a loading position in which the towing bed is tilted relative to the end of the frame; and wherein;
   said bed includes a longitudinal center of gravity; and
   said means for moving includes;
   means for tilting said towing bed relative to said vehicle frame such that said bed is progressively tilted due to the action of gravity on said center of gravity, said means for tilting having a pivot axis, said pivot axis being perpendicular to and in the horizontal plane of said longitudinal axis;
   first translation means, mounted between said vehicle frame and said means for tilting, for moving said means for tilting longitudinally relative to said vehicle frame; and
   second translation means, mounted between said means for tilting and said towing bed, for moving said towing bed linearly relative to said means for tilting.

14. The combination of claim 13, wherein:

said first translation means includes a first hydraulic cylinder with a first cylinder body, mounted to said vehicle frame, and a first piston rod, engaged to said means for tilting; and said second translation means includes a second hydraulic cylinder with a second cylinder body, engaged to said means for tilting so that said second cylinder rotates freely about said pivot axis, and a second piston rod, mounted to said towing bed.

15. In a tow truck having a frame, a longitudinal axis, and front and rear axles, a carriage comprising:

a bed having a longitudinal center of gravity, a first position in which said center of gravity is situated between said front and rear axles, a second position in which said center of gravity is aft of said rear axle and said bed is tilted relative to said frame; and mounting means connecting said bed to said frame and including;

a pivot axis perpendicular to said longitudinal axis;

first power means for moving said pivot axis between said first position and a third position aft of said rear axle; and second power means pivotably mounted to said pivot axis and operable to shift said center of gravity relative to said pivot axis to intermediate postions aft of said third position in which said bed is progressively pivoted at each of said intermediate positions about said pivot axis due to the action of gravity on said center of gravity as said bed is moved between said third position and said second position.

16. In a tow truck having a frame, a longitudinal axis, and front and rear axles, a carriage comprising:

a bed having a longitudinal center of gravity, a first position in which said center of gravity is situated between said front and rear axles, and a second position in which said center of gravity is aft of said rear axle and said bed is tilted relative to said frame; and mounting means connecting said bed to said frame and including;

means for moving said bed from said first position to said second position, operable to shift said center of gravity to intermediate positions aft of said rear axle in which said bed is progressively tilted due to the action of gravity on said center of gravity;

wherein said means for moving said bed includes:

first power means mounted to said frame, and including a first operator, having a pivot axis, operable to longitudinally translate said bed relative to said frame while maintaining said center of gravity forward of said pivot axis; and second power means mounted to said first operator and pivotable about said pivot axis, having a second operator connected to said bed operable to linearly translate said center of gravity relative to said pivot axis.

17. A towing bed comprising:

a concave floor of generally rectangular shape adapted for carrying an automobile thereon, and having a pair of lateral edges, a forward edge and a rear approach edge, and further having a radius of curvature of fity feet;

a pair of beam members, each of said pair having a central web, and each of said pair affixed at said web to opposite ones of said lateral edges, wherein said beam members include;

an upper flange perpendicular to said central web at an upper portion of said web and generally coextensive with said concave floor;

a lower flange perpendicular to said central web at a lower portion of said web and terminating at mid-length of the concave floor;

wherein said central web spans between said upper and lower flanges until the lower flange terminates, thereafter said lower portion of said webb following the curvature of the concave floor; and a pair of rails affixed to said concave floor adjacent opposite ones of said pair of lateral edges, coextensive with said concave floor and in spaced relation with opposite ones of said central webs.

* * * * *